United States Patent
Morin et al.

(10) Patent No.: US 9,879,611 B2
(45) Date of Patent: Jan. 30, 2018

(54) BLEED VALVE RESONANCE AUGMENTATIONS

(71) Applicant: United Technologies Corporation, Hartford, CT (US)

(72) Inventors: Bruce L. Morin, Springfield, MA (US); David A. Topol, West Hartford, CT (US); Mark Boyer, Vernon, CT (US); Brian Desfosses, Vernon, CT (US); W. Marshall Quin, North Haven, CT (US); John Holchin, Manchester, CT (US); Jonathan D. Little, West Hartford, CT (US); Bryan Roseberry, East Hartford, CT (US)

(73) Assignee: UNITED TECHNOLOGIES CORPORATION, Hartford, CT (US)

(*) Notice: Subject to any disclaimer, the term of this patent is extended or adjusted under 35 U.S.C. 154(b) by 202 days.

(21) Appl. No.: 14/754,298

(22) Filed: Jun. 29, 2015

(65) Prior Publication Data
US 2016/0153361 A1  Jun. 2, 2016

Related U.S. Application Data

(60) Provisional application No. 62/027,372, filed on Jul. 22, 2014.

(51) Int. Cl.
  F04D 27/02  (2006.01)
  F02C 6/08  (2006.01)
  (Continued)

(52) U.S. Cl.
  CPC .............. *F02C 9/18* (2013.01); *F01D 17/105* (2013.01); *F02C 3/13* (2013.01); *F02C 6/08* (2013.01);
  (Continued)

(58) Field of Classification Search
  CPC ......... F05D 2260/963; F05D 2260/962; F02C 6/08; F02C 9/18; F02C 7/24; F02C 7/18;
  (Continued)

(56) References Cited

U.S. PATENT DOCUMENTS

| | | | |
|---|---|---|---|
| 6,106,227 A | 8/2000 | Honda et al. | |
| 2007/0234738 A1* | 10/2007 | Borcea | F02C 6/08 60/785 |

(Continued)

FOREIGN PATENT DOCUMENTS

| | | |
|---|---|---|
| EP | 2031213 | 3/2009 |
| GB | 2443418 | 5/2008 |

(Continued)

OTHER PUBLICATIONS airplanepilot.blogspot.com/2005/06/bleeding-heats.html, Cockpit Converstation Bleeding Hearts, May 9, 2006, p. 1.*

(Continued)

*Primary Examiner* — William H Rodriguez
(74) *Attorney, Agent, or Firm* — Snell & Wilmer L.L.P.

(57) ABSTRACT

Bleed valve assemblies in a gas turbine engine are disclosed herein. A bleed valve assembly in a low pressure compressor may include a bleed valve and a resonator chamber. A manifold may allow passage of air from a bleed duct into the resonator chamber. The resonator chamber may alter resonation properties of the bleed duct in order to prevent damage to components in the low pressure compressor.

13 Claims, 6 Drawing Sheets

(51) Int. Cl.
*F02C 9/18* (2006.01)
*F01D 17/10* (2006.01)
*F04D 29/66* (2006.01)
*F16K 47/04* (2006.01)
*F16K 3/02* (2006.01)
*F02C 3/13* (2006.01)
*F04D 29/52* (2006.01)

(52) U.S. Cl.
CPC ....... *F04D 27/023* (2013.01); *F04D 27/0215* (2013.01); *F04D 29/522* (2013.01); *F04D 29/665* (2013.01); *F16K 3/02* (2013.01); *F16K 47/04* (2013.01); *F05D 2260/36* (2013.01); *F05D 2260/963* (2013.01)

(58) Field of Classification Search
CPC .... F16K 47/04; F04D 27/0215; F04D 29/665; F04D 29/40
See application file for complete search history.

(56) References Cited

U.S. PATENT DOCUMENTS

| | | | | |
|---|---|---|---|---|
| 2010/0095544 A1* | 4/2010 | Haseloh | ............... | F16B 19/02 33/645 |
| 2013/0239570 A1* | 9/2013 | Woollenweber | ........ | F02B 37/16 60/611 |
| 2013/0298885 A1* | 11/2013 | Efta | ................... | F01M 13/0011 123/574 |

FOREIGN PATENT DOCUMENTS

| | | | | |
|---|---|---|---|---|
| GB | 2443418 A | * | 5/2008 | ............... F02C 9/18 |
| WO | 2012057994 | | 5/2012 | |

OTHER PUBLICATIONS

Extended European Search Report dated Dec. 18, 2015 in European Application No. 15177633.3.

* cited by examiner

FIG. 6

BLEED VALVE RESONANCE AUGMENTATIONS

CROSS-REFERENCE TO RELATED APPLICATIONS

This application is a nonprovisional of, and claims priority to, and the benefit of U.S. Provisional Application No. 62/027,372, entitled "BLEED VALVE RESONANCE AUGMENTATIONS," filed on Jul. 22, 2014, which is hereby incorporated by reference in its entirety.

FIELD

The present disclosure relates generally to gas turbine engines. More particularly, the present disclosure relates to bleed valves in gas turbine engines.

BACKGROUND

Gas turbine engines typically comprise a compressor section. A bleed valve may remove bleed air from the compressor section. The bleed air may decrease instabilities in the compressor section, or may be used to supply air to various aircraft systems.

SUMMARY

A bleed valve assembly may comprise a bleed valve having an axial span bounding an aperture, a manifold located at least partially within the aperture, a chamber body assembly coupled to the manifold, and a resonator cover coupled to the chamber body assembly.

In various embodiments, the bleed valve assembly may be a 2.5 bleed valve for a gas turbine engine. The chamber body assembly may comprise a chamber body and a chamber flange. The chamber flange may comprise a female fastener located within the chamber body. The chamber body may comprise a forward portion and an aft portion. A depth of the aft portion may be greater than a depth of the forward portion. The chamber body may be in fluid communication with a bleed duct. The chamber flange may comprise an alignment peg.

A low pressure compressor ("LPC") case may comprise a first bleed duct and a first bleed valve assembly configured to seal the first bleed duct. The first bleed valve assembly may comprise a first resonator chamber.

In various embodiments, the LPC case may comprise a second bleed duct and a second bleed valve assembly configured to seal the first bleed duct. The second bleed valve assembly may comprise a second resonator chamber. A height of the first resonator chamber may be greater than a height of the second resonator chamber. A volume of the first resonator chamber may be equal to a volume of the second resonator chamber. The first resonator chamber may be in fluid communication with the first bleed duct. The first bleed valve assembly may comprise a bleed valve, a manifold, a chamber body assembly, and a resonator cover. The first bleed valve assembly may comprise a 2.5 bleed valve.

A gas turbine engine may comprise a low pressure compressor, a bleed duct configured to release bleed air from the low pressure compressor, and a first bleed valve assembly configured to seal the bleed duct. A resonator chamber may be in fluid communication with the bleed duct. The first bleed valve assembly may comprise a 2.5 bleed valve. The gas turbine engine may further comprise a second bleed valve assembly. A volume of the first bleed valve assembly may be equal to a volume of the second bleed valve assembly. A height of the first bleed valve assembly may be greater than a height of the second bleed valve assembly.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
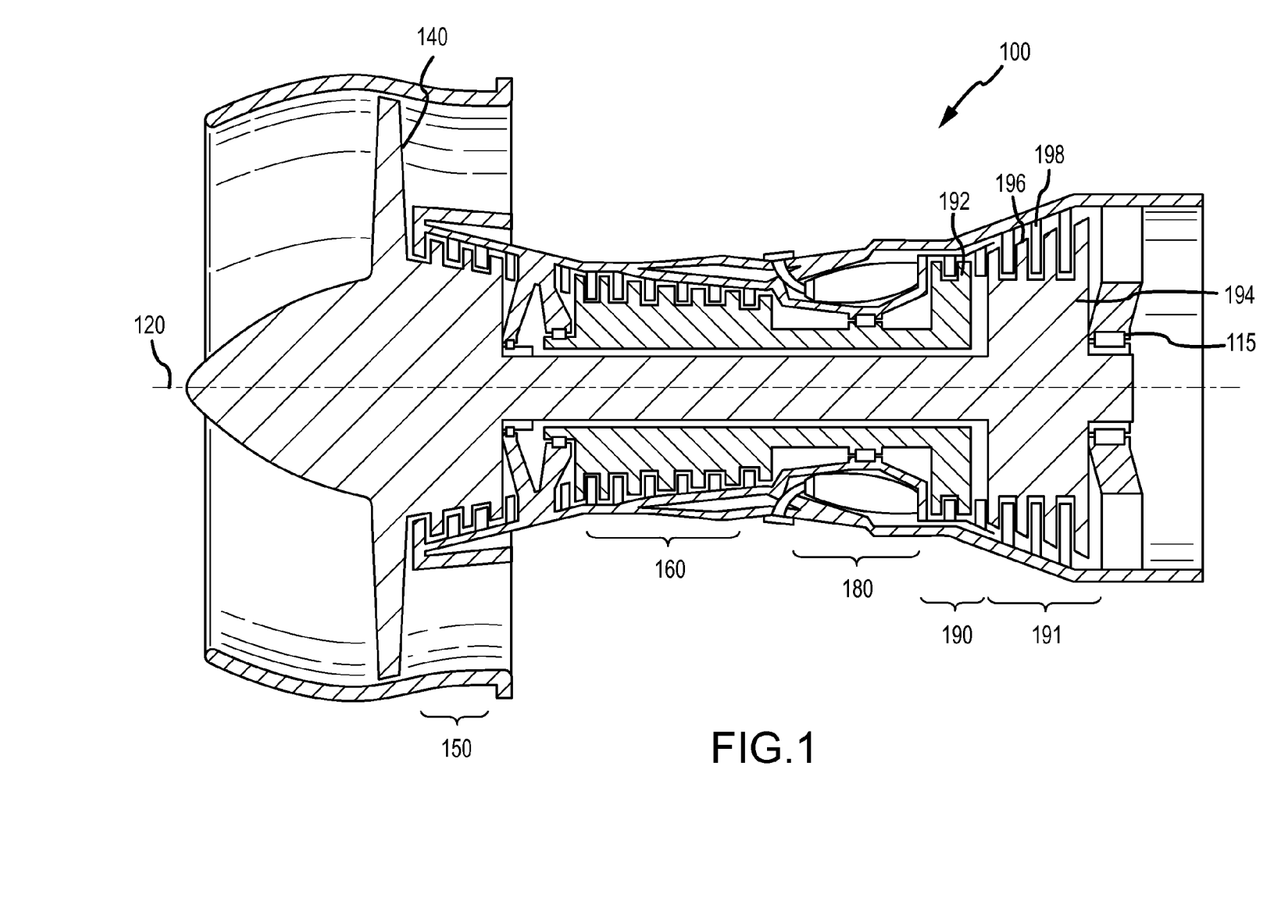
FIG. 1 illustrates a schematic cross-section view of a gas turbine engine in accordance with various embodiments.

Referring to FIG. 1, a gas turbine engine 100 (such as a turbofan gas turbine engine) is illustrated according to various embodiments. Gas turbine engine 100 is disposed about axial centerline axis 120, which may also be referred to as axis of rotation 120. Gas turbine engine 100 may comprise a fan 140, compressor sections 150 and 160, a combustion section 180, and turbine sections 190, 191. Air compressed in the compressor sections 150, 160 may be mixed with fuel and burned in combustion section 180 and expanded across turbine sections 190, 191. Turbine sections 190, 191 may include high pressure rotors 192 and low pressure rotors 194, which rotate in response to the expansion. Turbine sections 190, 191 may comprise alternating rows of rotary airfoils or blades 196 and static airfoils or vanes 198. A plurality of bearings 115 may support spools in the gas turbine engine 100. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2:
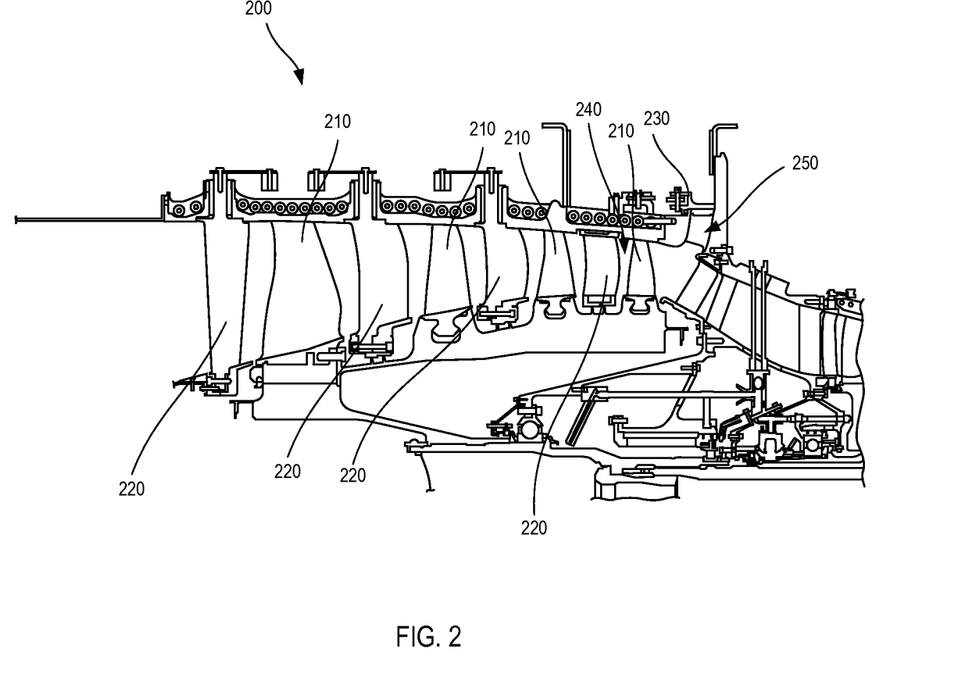
FIG. 2 illustrates a cross-section view of a low pressure compressor in accordance with various embodiments.

Referring to FIG. 2, a cross-section of a low pressure compressor ("LPC") 200 is illustrated according to various embodiments. LPC 200 may comprise alternating series of rotating blades 210 and vanes 220 in a core flowpath. LPC 200 may comprise a bleed valve 230. In various embodiments, the bleed valve 230 may be located aft of a fourth stage 240 of LPC 200. A bleed valve may control the quantity of air flowing into the high pressure compressor. In an embodiment, bleed valve 230 may be a 2.5 bleed valve. Bleed valve 230 may be opened in order to release bleed air through bleed duct 250. Bleed air may be released in order to decrease instability in the core flowpath, such as during start, during transient operation, and during reverse thrust operation.

While bleed valve 230 is closed, bleed air may be prevented from exiting the core flow path through bleed duct 250. Air flowing across bleed duct 250 may create a resonance in bleed duct 250. The resonance may cause vibrational waves to travel forward which may damage blades 210 in the compressor rotor closest to the bleed duct 250. In various embodiments, the compressor rotor closes to the bleed duct 250 may be the fourth stage 240. The frequency of the vibrational waves may be changed to prevent damage by altering the properties of bleed duct 250, such as a length or volume of bleed duct 250.

Bleed valve 230 may be a portion of a compressor control system. The compressor control system may give compressor stability during starting, transient, and reverse thrust operation. Bleed valve 230 may be commanded open by the Electronic Engine Control ("EEC") to bleed fourth stage air into the fan airstream. The EEC is the primary interface between the power plant and the aircraft which includes communication with various aircraft systems, such as thrust lever resolvers, air data/inertial reference systems, engine interface and vibration monitor units, on-board maintenance systems, electronic instrument systems, and automatic flight systems.

Figure 3:
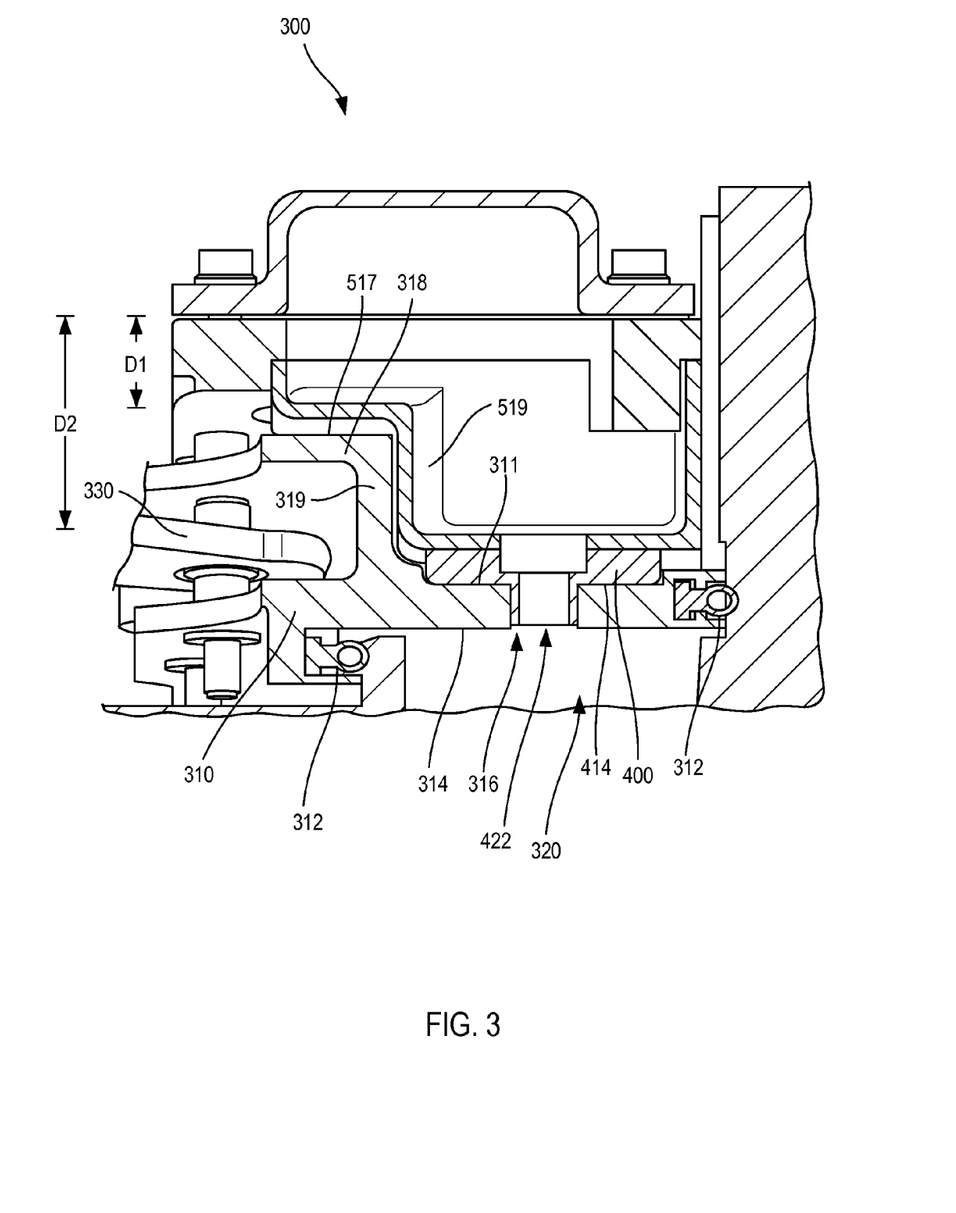
FIG. 3 illustrates a section view of a bleed valve assembly in accordance with various embodiments.

Referring to FIG. 3, a section-view of a bleed valve assembly 300 having a resonator chamber is illustrated according to various embodiments. Bleed valve assembly 300 may comprise bleed valve 310. Bleed valve 310 may comprise seals 312 which seal bleed duct 320. An actuator 330 may drive bleed valve 310 forward (toward the actuator 330) in order to release bleed air through bleed duct 320 and into the fan airstream. Bleed valve 310 may comprise an aperture 316 in axial span 314. Aperture 316 may be configured to receive a manifold 400.

Figure 4:
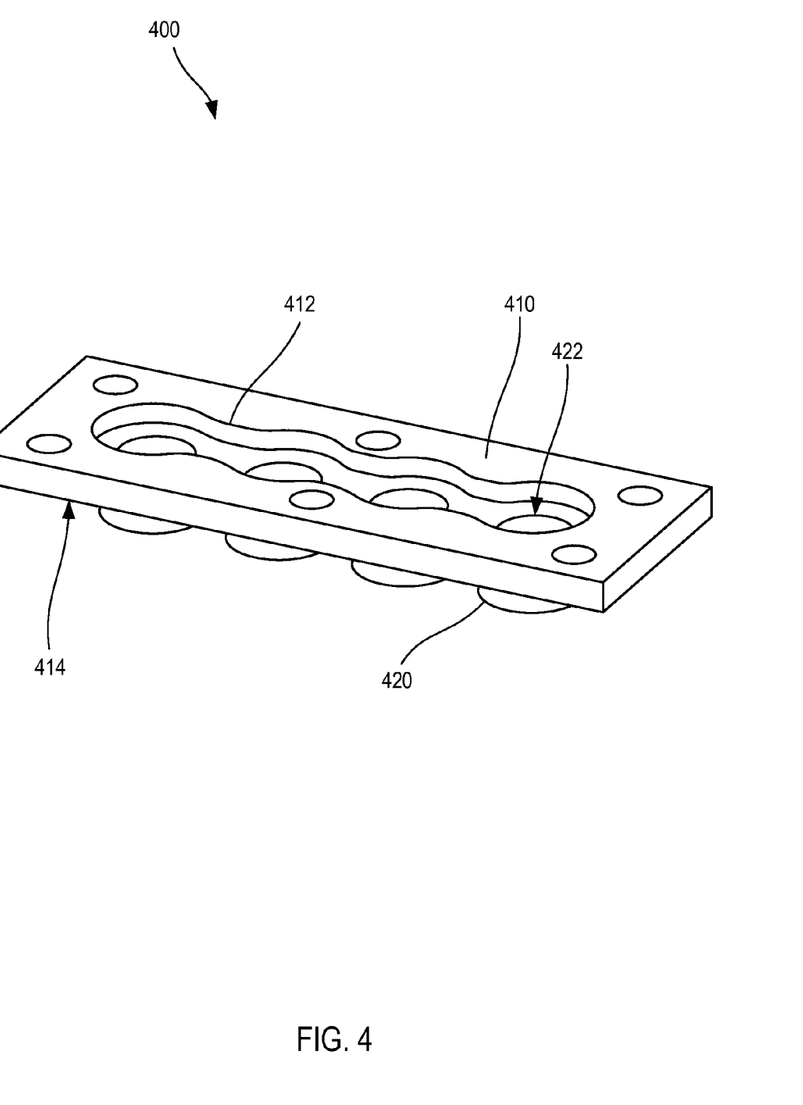
FIG. 4 illustrates a perspective view of a manifold in accordance with various embodiments.

Referring to FIGS. 3 and 4, bleed valve assembly 300 may comprise a manifold 400. Manifold 400 may be located at least partially within aperture 316 in axial span 314. Manifold 400 may comprise a platform 410 and one or more cylinders 420. Platform 410 may define a recess 412 surrounding cylinders 420. Cylinders 420 may extend radially inward from platform 410. Cylinders 420 may comprise passages 422. Passages 422 may allow bleed air to flow between bleed duct 320 and resonator chamber 500 of FIG. 4. In various embodiments, cylinders 420 may be located within aperture 316 in axial span 314. An inner face 414 of platform 410 may be adjacent to an outer face 311 of axial span 314.

Figure 5:
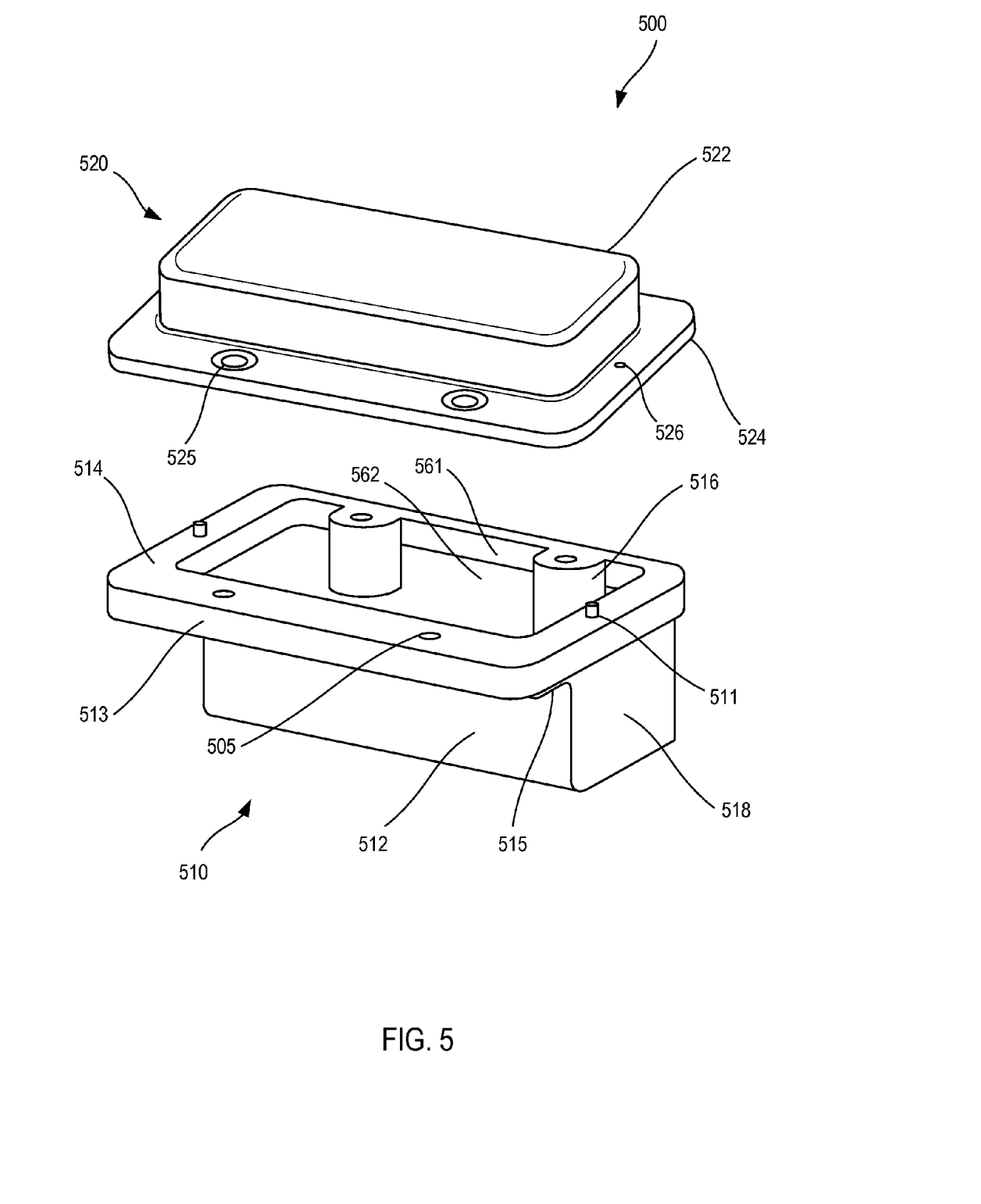
FIG. 5 illustrates a perspective view of a resonator chamber in accordance with various embodiments.

Referring to FIGS. 3 and 5, bleed valve assembly 300 may comprise a resonator chamber 500. Resonator chamber 500 may comprise a chamber body assembly 510 and a resonator cover 520. Chamber body assembly 510 may comprise a chamber body 512 and a chamber flange 514. Chamber body 512 may comprise a forward chamber 515 and an aft chamber 518. Forward chamber 515 may be located forward of aft chamber 518. A depth D1 of forward chamber 515 may be less than a depth D2 of aft chamber 518. A lower surface 517 of forward chamber 515 may be adjacent to an upper flange 318 of bleed valve 310. A forward wall 519 of aft chamber 518 may be adjacent to a forward wall 319 of bleed valve 310. Thus, chamber body 512 may comprise a stepped profile corresponding to the shape of bleed valve 310.

Chamber flange 514 may be located adjacent to a top edge of chamber body 512. An inner circumference 561 of chamber flange may be substantially flush with an inner surface 562 of chamber body 512. Chamber flange 514 may comprise female fasteners 516. In various embodiments, female threads 516 may be located inside of chamber body 512. Female threads 516 may be configured to receive a fastener, such as a bolt or screw. Chamber flange 514 may further comprise a cantilevered lip 513 located forward of chamber body 512. Cantilevered lip 513 may comprise bolt holes 505 configured to receive fasteners. Chamber flange 514 may comprise alignment pegs 511.

Resonator cover 520 may comprise cover body 522 and cover flange 524. Cover flange 524 may comprise fastener holes 525 and alignment holes 526. Cover flange 524 may be configured to mate with chamber flange 514. Alignment pegs 511 may fit within alignment holes 526 in order to align resonator cover 520 with chamber flange 514.

Resonator chamber 500 may be in fluid communication with bleed duct 320. Thus, resonator chamber 500 may alter the resonation properties of bleed duct 320, and may change the frequency of vibrational waves caused by airflow over bleed duct 320 with bleed valve 310 closed. In various embodiments, resonator cover 520 may be interchangeable with resonator covers having different volumes, which may alter the resonation properties of bleed duct 320 without changing the chamber body assembly 510.

Figure 6:
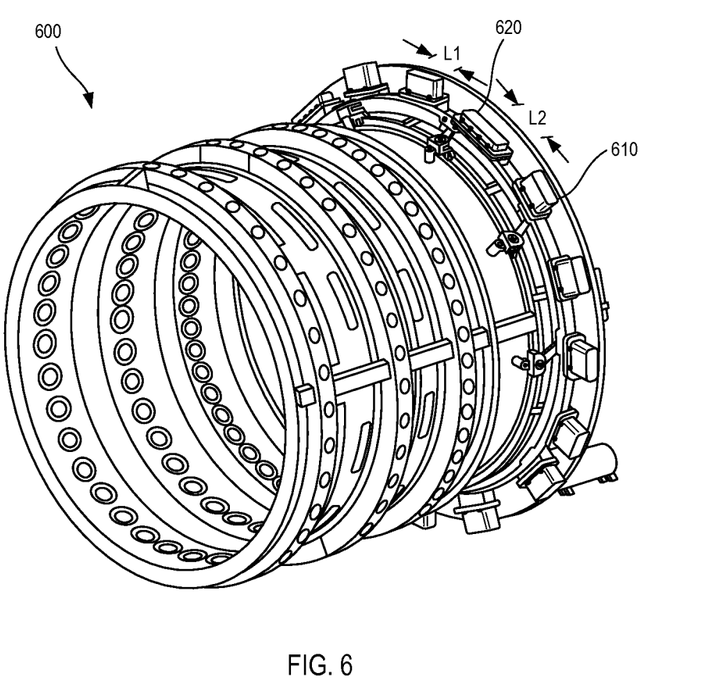
FIG. 6 illustrates a perspective view of a low pressure compressor case in accordance with various embodiments.

Referring to FIG. 6, a perspective view of a low pressure compressor ("LPC") case 600 is illustrated according to various embodiments. LPC case 600 may comprise one or more high profile resonator chambers 610 corresponding to bleed ducts. In various embodiments, the plurality of high profile resonator chambers 610 may each have the same volume. In various embodiments, LPC case 600 may comprise one or more low profile resonator chambers 620. In various embodiments, a height of the high profile resonator chambers 610 may be greater than a height of the low profile resonator chamber 620. However, a length L1 of the high profile resonator chambers 610 may be less than a length L2 of the low profile resonator chamber 620. Thus, a volume of the high profile resonator chambers 610 may be equal to a volume of the low profile resonator chamber 620. Different shapes of resonator chambers may be used in order to meet space restraint requirements while maintaining equal volumes. In various embodiments, all resonator chambers may have the same volume. However, in various embodiments different resonator chambers may have different volumes.

Although described primarily herein as being in fluid communication with a bleed duct via a bleed valve, the resonator chambers may be located at any position such that the resonator chambers are in fluid communication with the bleed duct. For example, a resonator chamber may be in fluid communication with the bleed duct via an aperture in a forward or aft wall of the bleed duct, or in any other suitable location.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A bleed valve assembly comprising:
 a bleed valve including an axial span bounding an aperture;
 a manifold located at least partially within the aperture;
 a chamber body assembly coupled to the manifold, wherein the manifold comprises a passage configured to fluidly connect the chamber body assembly to a bleed duct, wherein the chamber body assembly comprises a forward chamber and an aft chamber, wherein a depth of the forward chamber is less than a depth of the aft chamber;
 a resonator cover coupled to the chamber body assembly; and
 an actuator configured to open and close the bleed valve.

2. The bleed valve assembly of claim 1, wherein the chamber body assembly comprises a chamber body and a chamber flange.

3. The bleed valve assembly of claim 2, wherein the chamber flange comprises one or more female threads located within the chamber body.

4. The bleed valve assembly of claim 2, wherein the chamber flange comprises an alignment peg.

5. A low pressure compressor ("LPC") case comprising:
 a first bleed duct; and
 a first bleed valve assembly configured to seal the first bleed duct, the first bleed valve assembly comprising a first resonator chamber and an actuator configured to open and close the bleed valve assembly,
 wherein the first resonator chamber comprises a forward chamber and an aft chamber, wherein a depth of the forward chamber is less than a depth of the aft chamber,
 wherein the first bleed valve assembly comprises a manifold, the manifold comprising a passage fluidly connecting the first resonator chamber to the bleed duct.

6. The LPC case of claim 5, further comprising a second bleed duct and a second bleed valve assembly configured to seal the second bleed duct, the second bleed valve assembly comprising a second resonator chamber.

7. The LPC case of claim 6, wherein a height of the first resonator chamber is greater than a height of the second resonator chamber.

8. The LPC case of claim 7, wherein a volume of the first resonator chamber is equal to a volume of the second resonator chamber.

9. The LPC case of claim 5, wherein the first bleed valve assembly comprises a bleed valve, a manifold, a chamber body assembly, and a resonator cover.

10. A gas turbine engine comprising:
 a low pressure compressor;
 a bleed duct configured to release bleed air from the low pressure compressor;
 a first bleed valve assembly configured to seal the bleed duct;
 an actuator configured to open and close the first bleed valve assembly; and
 a resonator chamber in fluid communication with the bleed duct via a passage in a manifold of the first bleed valve assembly,
 wherein the resonator chamber comprises a forward chamber and an aft chamber, wherein a depth of the forward chamber is less than a depth of the aft chamber.

11. The gas turbine engine of claim 10, further comprising a second bleed valve assembly.

12. The gas turbine engine of claim 11, wherein a volume of the first bleed valve assembly is equal to a volume of the second bleed valve assembly.

13. The gas turbine engine of claim 12, wherein a height of the first bleed valve assembly is greater than a height of the second bleed valve assembly.

\* \* \* \* \*